Oct. 5, 1937. W. J. HOOPER 2,094,889
FAUCET CONNECTER
Filed Nov. 27, 1936
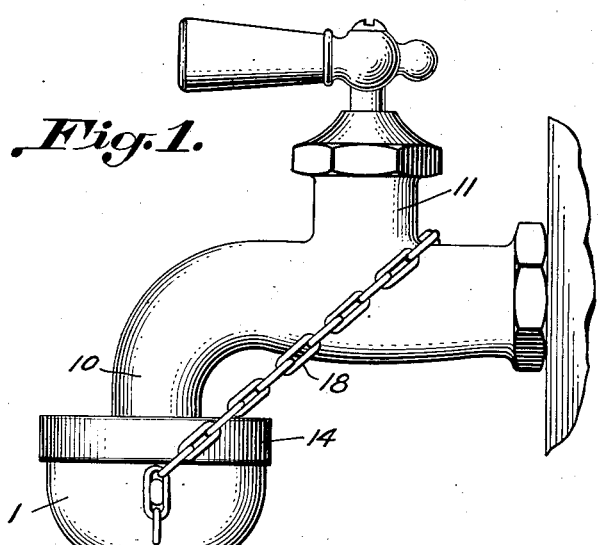
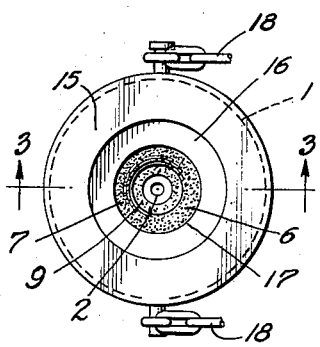
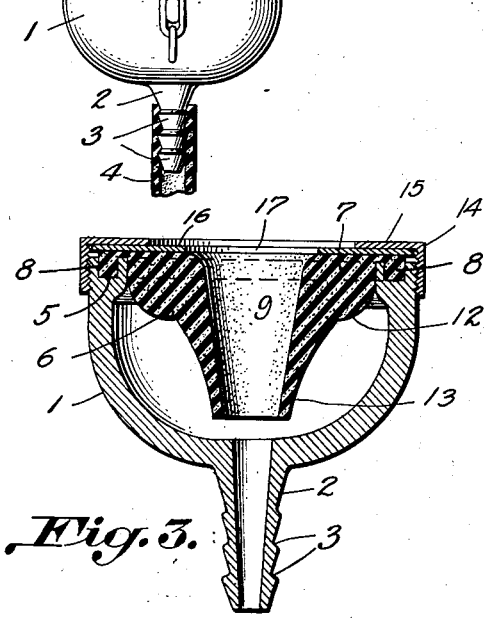
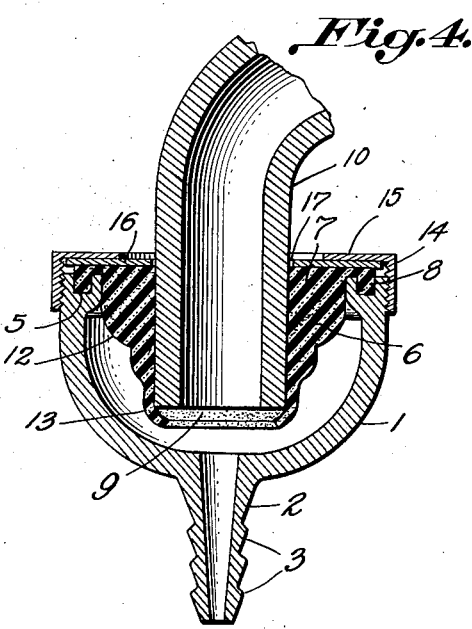
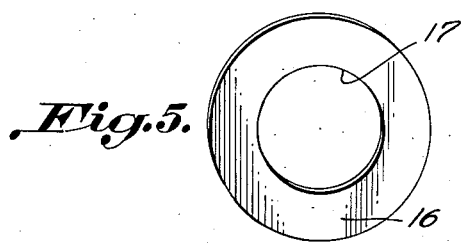
Inventor.
WILLIAM J. HOOPER.
By
ATTORNEY.

Patented Oct. 5, 1937

2,094,889

UNITED STATES PATENT OFFICE 2,094,889

FAUCET CONNECTER

William J. Hooper, Elsah, Ill., assignor of one-half to Harold A. Hooper, Chicago, Ill.

REISSUED

Application November 27, 1936, Serial No. 112,910

1 Claim. (Cl. 285—163)

My invention relates to a new and useful improvement in faucet connecters, and has for its principal object to provide such a device that is adaptable to faucets of various sizes, particularly as to the faucet fluid discharge tube outlet. Another primary object is to provide a faucet connecter that remains tenaciously engaged with the faucet when applied thereto, and especially when the water under pressure is flowing from said faucet and through the faucet connecter. Another object is to provide a faucet connecter having a relatively soft rubber member to fit over the discharge tube of the faucet, which, due to its flexibile qualities, will expand any required amount to accommodate said faucet tube and cling with great persistence thereto, particularly during the time when water under pressure is passing therethrough. Another object of my invention is to so form said rubber member as to cause it to resist the pressure of the water which might tend to cause the rubber member to be blown upwardly by said pressure and thereby force said connecter into inoperative position. Another object of my invention is to provide a circumferential, downturned lip at the top portion of the rubber member which is adapted to enter into a circumferential groove in the outer casing of my connecter, whereby, when the holding clamp or cover is applied to the outer casing over the rubber member, said member will be securely held in place in said connecter.

These and other objects not herein particularly referred to will appear from the description of my improved device as hereinafter set forth.

Heretofore faucet connecters, so far as I am aware, have usually been made with relatively hard rubber members for embracing the water discharge tube of the faucet and were difficult to apply to any faucet except of a size as to the water discharge tube for which said connecter was made. Usually when applied to a larger size faucet the rubber member is subject to splitting and thereby may be destroyed, due to the relatively inelastic nature of said member, and if applied to a smaller size faucet the rubber member would not securely grip said faucet. Therefore faucet connecters of different sizes were required for different size faucets. By my invention I provide one size connecter adaptable to faucets of varying sizes within a reasonable range, the faucets being accommodated by a adapter formed of a relatively hard, inelastic material placed between the rubber member and the cap, or cover, for retaining said member in the outer casing.

Fig. 1 is a side view of my improved connecter applied to a faucet.

Fig. 2 is a top plan view of my improved connecter.

Fig. 3 is an enlarged, cross-sectional view of my improved connecter taken on the line 3—3 of Fig. 2, looking in the direction of the arrows.

Fig. 4 is a view similar to Fig. 3, also in cross-section, showing my improved connecter applied to a faucet.

Fig. 5 is an enlarged view of one of my adapters to be placed in my improved connecter to accommodate a faucet of a particular size.

A casing 1 is provided, preferably formed of hard rubber or bakelite, though it can also be formed of metal. The casing 1 terminates at its bottom portion in a downwardly projecting, tubular member 2, preferably having a series of serrations 3 on the outside thereof. The purpose of the tubular member 2 is to receive one end of a tube 4 adapted to be applied thereto, so that water may pass through said tubular member 2 and the tube 4, when the water is flowing, the serrations 3 tending to securely hold the tube 4 in position on the tubular member 2.

The casing 1 is provided at its upper end with a circumferential groove 5. Inside the casing 1 I place a relatively soft, flexible rubber member 6 provided with a large, annular portion 7 at the upper portion thereof and having a downturned, circumferential lip 8 formed at the outer edge of the annular portion 7 of said member 6. The member 6 is vertically apertured as at 9, so that said member 2 may be fitted over the discharge tube 10 of a faucet 11. The member 6 is provided on the exterior side thereof with a circumferential bulge of rubber 12 for the purpose of providing a resistance device to the member 6 to prevent the water pressure from displacing said member 6 with respect to the faucet tube 10 when my connecter is in service. The rounded formation of the bulge 12 directs the upward pressure of the water to the inner and upper side of the casing 1 and causes a pressure against the upper portion of the member 6, thereby causing said member to be more firmly pressed against the faucet tube 10. It will be noted that the tubular member 2 is smaller than the faucet tube 10, therefore when the faucet 11 is turned on full a back pressure in the casing 1 tends to develop.

The tubular member 6 has a downwardly projecting, tubular portion 13 which is preferably thinner than the main part of the member 6, and such portion 13 is adapted to embrace the lower part of the faucet tube 10, and due to its flexible character it clings to said tube 10. When the member 6 is inserted in the casing 1, the downturned lip 8 fits into the groove 5 in the member 6, as seen in Figs. 3 and 4.

In order to hold the member 6 in position in the casing 1, I provide a cap or cover 14, preferably screw-threaded onto the top of the casing 1 and provided with a relatively narrow, inwardly projecting ledge 15. Between the top of the member 6 and the ledge 15 I may place an adapter 16 depending on the size of the faucet tube 10. As my connecter is of a size considerably larger than any standard faucet ordinarily employed in home use, an adapter, or pressure resistant ring, 16 is generally necessary to permit the use of my said connecter. It will be understood that the central aperture 17 in the adapter 16 is regulated by the size of the faucet tube 10. I provide a chain 18 adapted to be secured to the outside portion of the casing 1, which chain may be looped about the faucet 11 when my connecter is applied to said faucet.

In many places where running water is supplied, it is usually with a pressure of from 40 to 100 pounds per square inch. When a faucet is turned to permit the flow of water therethrough a faucet connecter applied to said faucet should successfully resist such pressure and remain firmly in position on the tube of said faucet. By my improved connecter I have succeeded in providing a device which always clings more tenaciously as the water pressure is applied thereto, due largely to the formation of the bulge 12 on the member 6. When the faucet is closed it is only necessary in order to detach the connecter to twist it back and forth tangentially while the connecter is being pulled downwardly. To attach my connecter it is only necessary to slip it up over the faucet tube 10.

I claim:

A faucet connecter comprising a casing, a flexible, tubular member adapted to be slipped over the water discharge tube of a faucet, a bulge of flexible material intermediate the upper and lower portions of said flexible, tubular member, a rigid pressure resistant ring having an aperture of a size closely approximating the diameter of said water discharge tube of a faucet inserted in said casing over said flexible, tubular member, and means for securing said flexible, tubular member and said ring in said casing.

WILLIAM J. HOOPER.